United States Patent
Kinsho et al.

[11] Patent Number: 6,040,398
[45] Date of Patent: Mar. 21, 2000

[54] EPOXY CURING AGENT AND ONE-COMPONENT (TYPE) EPOXY RESIN COMPOSITION

[75] Inventors: Toshihiko Kinsho; Munekazu Satake; Tadakazu Miyazaki, all of Kyoto, Japan

[73] Assignee: Sanyo Chemical Industries Ltd., Kyoto, Japan

[21] Appl. No.: 09/146,075

[22] Filed: Sep. 2, 1998

Related U.S. Application Data

[62] Division of application No. 08/683,564, Jul. 12, 1996, Pat. No. 5,837,785.

[30] Foreign Application Priority Data

Jul. 12, 1995 [JP] Japan ................................ 7-200551
Nov. 8, 1995 [JP] Japan ................................ 7-315996

[51] Int. Cl.[7] .............................................. C08F 283/000
[52] U.S. Cl. ......................... 525/527; 525/526; 528/117
[58] Field of Search ........................ 525/527, 526; 528/117

[56] References Cited

U.S. PATENT DOCUMENTS

| | | | |
|---|---|---|---|
| 4,376,844 | 3/1983 | Emmoms et al. | 525/117 |
| 4,772,716 | 9/1988 | Mülhaupt et al. | 548/110 |
| 4,874,805 | 10/1989 | Mülhaupt et al. | 524/188 |
| 5,023,298 | 6/1991 | Miwa et al. | 525/103 |
| 5,081,257 | 1/1992 | Greco | 548/215 |
| 5,219,979 | 6/1993 | Greco | 528/220 |
| 5,235,062 | 8/1993 | Greco et al. | 548/215 |

FOREIGN PATENT DOCUMENTS 2060958  2/1992  Canada .
228935   7/1987  European Pat. Off. .

*Primary Examiner*—Robert Dawson
*Assistant Examiner*—D. Aylward
*Attorney, Agent, or Firm*—Pollock, Vande Sande & Amernick

[57] ABSTRACT

An epoxy curing agent comprising a heterocycle-containing compound having a backbone chain selected from the group consisting of polyether, polyvinyl, polyester, polyamide, polycarbonate, and novolac chains and at least two heterocyclic groups of the following general formula (1) as side chains, and a one-component (type) epoxy resin composition comprising said epoxy curing agent and a polyepoxy compound,

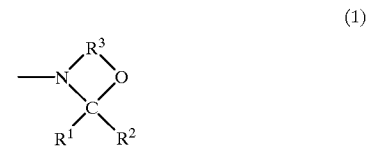

(1)

wherein $R_1$ and $R_2$ may be the same or different and each represents hydrogen, straight-chain or branched $C_1$ to $C_6$ alkyl or alkenyl, or $C_6$ to $C_8$ aryl; or $R_1$ and $R_2$, taken together with the adjacent carbon atom, represents $C_5$ to $C_7$ cycloalkyl; $R_3$ represents $C_1$ to $C_{10}$ alkylene. The object is to provide the one-component (type) epoxy resin composition having fast-curing feature, an improved storage stability, and an improved degree of workability.

6 Claims, No Drawings

EPOXY CURING AGENT AND ONE-COMPONENT (TYPE) EPOXY RESIN COMPOSITION

This is a Divisional of Ser. No. 08/683,564, filed Jul. 12, 1996, now U.S. Pat. No. 5,837,785.

FIELD OF THE INVENTION

The present invention relates to an epoxy curing agent and a one-component (type) epoxy resin composition containing the same. More particularly, the invention relates to a one-component (type) epoxy resin composition which is curable with moisture at room temperature at a high cure rate and has good storage stability.

BACKGROUND OF THE INVENTION

Because of its beneficial characteristics, epoxy resin has been in broad use in the coating, adhesion, civil engineering, and building industries. However, since most of the compositions so far available are of the two-component type, they have the drawback of poor workability. To provide a one-component (type) composition, there have been developed several alternative techniques such as the method using a latent curing agent, e.g. dicyandiamide, as a curing component, the method using a catalyst adapted to generate an active group upon exposure to ultraviolet radiation to cure epoxy resin, or the method using an acid anhydride type curing agent. However, these methods require either a heating step or an irradiation equipment.

To provide a one-component (type) room temperature cure system for overcoming the above drawback, a method is known in which a ketimine is used as a curing agent to produce an amine on contact with external moisture and thereby cure epoxy resin, but this technique has the disadvantage of retarded cure, poor storage stability, and excessive post-cure hardness which call for critical control over the level of addition.

SUMMARY OF THE INVENTION

The above problems have been solved by the present invention, which has for its object to provide a one-component (type) epoxy resin composition having a fast-curing feature, an improved storage stability, and an improved degree of workability and an epoxy curing agent for said composition.

The inventors of the present invention did much research and could develop an epoxy curing agent and a one-component (type) epoxy resin composition, with which the above problems could be successfully solved.

The present invention, therefore, is directed to an epoxy curing agent comprising a heterocycle-containing compound having a backbone chain selected from the group consisting of polyether, polyvinyl, polyester, polyamide, polycarbonate, and novolac chains and at least two heterocyclic groups of the following general formula (1) as side chains, and to a one-component (type) epoxy resin composition comprising said epoxy curing agent and a polyepoxy compound as the main component,

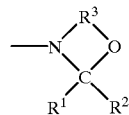
(1)

wherein $R^1$ and $R_2$ may be the same or different and each represents hydrogen, straight-chain or branched $C_1$ to $C_6$ alkyl or alkenyl, or $C_6$ to $C_8$ aryl; or $R^1$ and $R^2$, taken together with the adjacent carbon atom, represents $C_5$ to $C_7$ cycloalkyl; $R^3$ represents $C_1$ to $C_{10}$ alkylene.

DETAILED DESCRIPTION

In the epoxy curing agent of the present invention, $R^1$ and $R^2$ in the general formula (1) representing the heterocyclic group of said heterocycle-containing compound include but are not limited to hydrogen, methyl, ethyl, propyl, isopropyl, butyl, isobutyl, secondary butyl, tertiary butyl, pentyl, isopentyl, neopentyl, tertiary pentyl, hexyl, isohexyl, vinyl, allyl, propenyl, phenyl, and benzyl. The cycloalkyl group that may be formed by $R^1$ and $R^2$ taken together with the adjacent carbon atom includes but is not limited to cyclopentyl, cyclohexyl, and cycloheptyl. From the standpoint of cure rate, it is preferable that either $R^1$ or $R^2$ represents hydrogen or a straight-chain or branched alkyl group of 1 to 3 carbon atoms and it is more preferable that either $R^1$ or $R^2$ be hydrogen, methyl, or ethyl. $R^3$ includes but is not limited to methylene, ethylene, trimethylene, propylene, tetramethylene, ethylethylene, pentamethylene, hexamethylene, heptamethylene, and octamethylene. From the standpoint of cure rate, ethylene, propylene, tetramethylene, and pentamethylene are preferred.

In the epoxy curing agent of the present invention, the above-mentioned heterocycle-containing compound has at least two heterocyclic groups of general formula (1) as side chains. If the number of heterocyclic groups (1) is less than 2, the epoxy curing effect will not be sufficient. The preferred number of heterocyclic groups (1) is 3 through 7.

The epoxy curing agent of the present invention either has no active hydrogen or has active hydrogen, preferably with an active hydrogen equivalent of not less than 4000. The term "active hydrogen" as used herein means the hydrogen atom bound to an oxygen, nitrogen or sulfur atom which is high in electrical negativity and the term "active hydrogen equivalent" is used herein to mean the molecular weight per equivalent of active hydrogen. The group containing active hydrogen includes hydroxy, amino, imino and thiol, among others.

As the heterocycle-containing compounds having polyether, polyvinyl, polyester, polyamide, polycarbonate and novolac backbone chains, respectively, the compounds having the structures represented by the following general formulas (2) through (9) can be mentioned as examples.

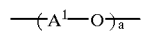
(2)

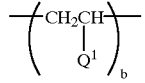
(3)

-continued

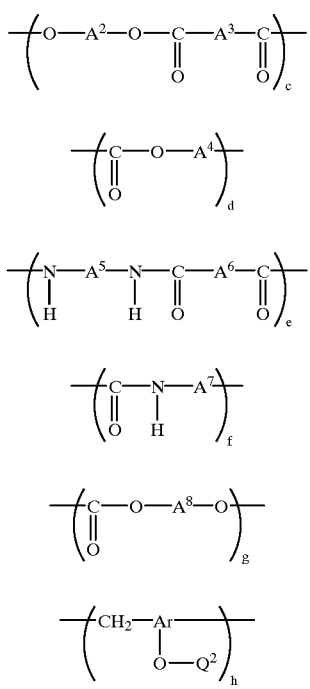

The above compounds are now described in detail.

The heterocycle-containing compound having the structure of general formula (2) has a polyether chain as the backbone chain.

Referring to general formula (2), a represents an integer of 2 to 200. In consideration of the viscosity of the epoxy curing agent and the hardness of the cured epoxy resin, a is preferably in a range of 2 to 100. $A^1$ represents alkylene which is either substituted by —X—Z or unsubstituted, arylene, arylalkylene, haloalkylene, or a residue available on ring-opening polymerization of a glycidyl ether. As used throughout this specification, —X—Z means a group of the formula —X—Z (wherein X represents a divalent organic group; Z represents a heterocyclic group of general formula (1)).

As examples of X mentioned above, hydrocarbon groups which may optionally have one or more linkages selected from the group consisting of ether, carbonate, ester, imino, amide, urethane, urea, and sulfide linkages can be mentioned. Thus, X includes but is not limited to —CH$_2$—, —CH$_2$CH$_2$—, —CH$_2$OCH$_2$CH$_2$—, —CHOC(=O)OCH$_2$—, —CH$_2$NHCH$_2$CH$_2$—, —CH$_2$NHC(=O)NH(CH$_2$)$_6$NHC(=O)O—, and —CH$_2$S(CH$_2$)$_2$C(=O)O(CH$_2$)$_2$—.

In at least two of a occurrences in general formula (2), $A^1$ represents alkylene substituted by —X—Z. In consideration of the hardness of the cured epoxy resin, it is preferable that $A^1$ be alkylene substituted by —X—Z in 3 to 7 of said a occurrences.

Thus, $A^1$ in general formula (2) includes alkylene such as methylene, ethylene, trimethylene, propylene, tetramethylene, ethylethylene, pentamethylene, hexamethylene, heptamethylene, octamethylene, etc. which is substituted by —X—Z; alkylene such as methylene, ethylene, trimethylene, propylene, tetramethylene, ethylethylene, pentamethylene, hexamethylene, heptamethylene, octamethylene, etc.; arylene such as phenylene, tolylene, naphthylene, etc.; arylalkylene such as phenylethylene, tolylethylene, etc.; haloalkylene such as chloroethylene, dichloroethylene, bromoethylene, chloromethylene, etc.; and the residues available on ring-opening polymerization of glycidyl ethers such as butyl glycidyl ether, phenyl glycidyl ether, allyl glycidyl ether, 2-ethylhexyl glycidyl ether, cresyl glycidyl ether, p-sec-butylphenyl glycidyl ether, glycidyl methacrylate, diglycidyl ether, (poly)ethylene glycol diglycidyl ether, (poly)propylene glycol diglycidyl ether, butanediol diglycidyl ether, diglycidylaniline, trimethylolpropane triglycidyl ether, glycerin triglycidyl ether, etc.

The heterocycle-containing compound having the structure of general formula (3) has a polyvinyl backbone chain.

Referring to general formula (3), b represents an integer of 2 to 200. In consideration of the viscosity of the epoxy curing agent and the hardness of the cured epoxy resin, b is preferably in a range of 2 to 100. $Q^1$ represents hydrogen, alkyl, aryl, haloalkyl, haloaryl, alkoxycarbonyl, acetoxy, or —X—Z.

In at least two of b occurrences in general formula (3), $Q^1$ represents —X—Z. From the standpoint of hardness of the cured epoxy resin, it is preferable that $Q^1$ be —X—Z in 3 through 7 occurrences.

$Q^1$ in general formula (3) includes hydrogen; alkyl such as methyl, ethyl, etc.; aryl such as phenyl, tolyl, etc.; haloalkyl such as chloromethyl, chloroethyl, etc.; haloaryl such as chloromethylphenyl, chloroethylphenyl, 2,4,6-trichlorophenyl, 2,4,6-tribromophenyl, etc.; alkoxycarbonyl such as methoxycarbonyl, ethoxycarbonyl, butoxycarbonyl, etc.; acetoxy; and —X—Z, among others.

The heterocycle-containing compound having the structure of general formula (4) has a polyester backbone chain.

Referring to general formula (4), c represents an integer of 2 to 200. In consideration of the viscosity of the epoxy curing agent and the hardness of the cured epoxy resin, c is preferably in a range of 2 to 100. $A^2$ and $A^3$ are the same or different and each represents alkylene which is either substituted by —X—Z or unsubstituted, arylene which is either substituted by —X—Z or unsubstituted, aralkylene, or haloalkylene.

At least two of c occurrences of $A^2$ and c occurrences of $A^3$ represent at least one species selected from the group consisting of alkylene substituted by —X—Z and arylene substituted by —X—Z. In consideration of the hardness of the cured epoxy resin, it is preferable that in 3 to 7 occurrences, $A^2$ and/or $A^3$ be at least one species selected from the group consisting of alkylene substituted by —X—Z and arylene substituted by —X—Z.

Each of $A^2$ and $A^3$ in general formula (4) includes alkylene such as methylene, ethylene, trimethylene, propylene, tetramethylene, ethylethylene, pentamethylene, hexamethylene, heptamethylene, octamethylene, etc. which is substituted by —X—Z; arylene such as phenylene, tolylene, etc. which is substituted by —X—Z; alkylene such as methylene, ethylene, trimethylene, propylene, tetramethylene, ethylethylene, pentamethylene, hexamethylene, heptamethylene, octamethylene, etc.; arylene such as phenylene, tolylene, etc.; aralkylene such as benzylidene, phenylethylene, etc.; and haloalkylene such as chloroethylene, dichloroethylene, bromoethylene, chloromethylethylene, 1,2-dichlorobutylene, 1-chlorobutylene, etc.

The heterocycle-containing compound having the structure represented by general formula (5) has a polyester backbone chain.

In general formula (5), d represents an integer of 2 to 200. In consideration of the viscosity of the epoxy curing agent and the hardness of the cured epoxy resin, d is preferably in a range of 2 to 100. $A^4$ represents alkylene which is either substituted by —X—Z or unsubstituted, arylene which is either substituted by —X—Z or unsubstituted, aralkylene, or haloalkylene.

In at least two of d occurrences in general formula (5), $A^4$ represents at least one species selected from the group consisting of alkylene substituted by —X—Z and arylene substituted by —X—Z. In consideration of the hardness of the cured epoxy resin, it is preferable that in 3 to 7 occurrences, $A^4$ be at least one species selected from the group consisting of alkylene substituted by —X—Z and arylene substituted by —X—Z.

$A^4$ in general formula (5) includes the species mentioned for $A^2$ and $A^3$ hereinbefore.

The heterocycle-containing compound having the structure represented by general formula (6) has a polyamide backbone chain.

In general formula (6), e represents an integer of 2 to 200. In consideration of the viscosity of the epoxy curing agent and the hardness of the cured epoxy resin, e is preferably in a range of 2 to 100. $A^5$ and $A^6$ may be the same or different and each represents alkylene which is either substituted by —X—Z or unsubstituted, arylene which is either substituted by —X—Z or unsubstituted, aralkylene, or haloalkylene.

At least two of e occurrences of $A^5$ and e occurrences of $A^6$ in general formula (6) represent at least one species selected from the group consisting of alkylene substituted by —X—Z and arylene substituted by —X—Z. From the standpoint of the hardness of the cured epoxy resin, it is preferable that in 3 to 7 occurrences, $A^5$ and/or $A^6$ be at least one species selected from the group consisting of alkylene substituted by —X—Z and arylene substituted by —X—Z.

$A^5$ and $A^6$ in general formula (6) include the species mentioned for $A^2$ and $A^3$ hereinbefore.

The heterocycle-containing compound having the structure represented by general formula (7) has a polyamide backbone chain.

In general formula (7), f represents an integer of 2 to 200. In consideration of the viscosity of the epoxy curing agent and the hardness of the cured epoxy resin, f is preferably in a range of 2 to 100. $A^7$ represents alkylene which is either substituted by —X—Z or unsubstituted, arylene which is either substituted by —X—Z or unsubstituted, aralkylene, or haloalkylene.

In at least two of f occurrences in general formula (7), $A^7$ represents at least one species selected from the group consisting of alkylene substituted by —X—Z and arylene substituted by —X—Z. From the standpoint of the hardness of the cured epoxy resin, it is preferable that in 3 to 7 occurrences, $A^7$ be at least one species selected from the group consisting of alkylene substituted by —X—Z and arylene substituted by —X—Z.

$A^7$ in general formula (7) includes the species mentioned for $A^4$ hereinbefore.

The heterocycle-containing compound having the structure represented by general formula (8) has a polycarbonate backbone chain.

In general formula (8), g represents an integer of 2 to 200. In consideration of the viscosity of the epoxy curing agent and the hardness of the cured epoxy resin, g is preferably in a range of 2 to 100. $A^8$ represents alkylene which is either substituted by —X—Z or unsubstituted, arylene which is either substituted by —X—Z or unsubstituted, aralkylene, or haloalkylene.

In at least two of g occurrences in general formula (8), $A^8$ represents at least one species selected from the group consisting of alkylene substituted by —X—Z and arylene substituted by —X—Z. From the standpoint of the hardness of the cured epoxy resin, it is preferable that in 3 to 7 occurrences, $A^8$ be at least one species selected from the group consisting of alkylene substituted by —X—Z and arylene substituted by —X—Z.

$A^8$ in general formula (8) includes the species mentioned for $A^4$ hereinbefore.

The heterocycle-containing compound having the structure represented by general formula (9) has a novolac backbone chain.

In general formula (9), h represents an integer of 2 to 200. In consideration of the viscosity of the epoxy curing agent and the hardness of the cured epoxy resin, h is preferably in a range of 2 to 200. Ar represents aryl. $Q^2$ represents hydrogen, epoxy, or —X—Z.

In at least two of h occurrences in general formula (9), $Q^2$ represents —X—Z. From the standpoint of the hardness of the cured epoxy resin, it is preferable that in 3 to 7 occurrences, $Q^2$ be at least one species selected from the group consisting of alkylene substituted by —X—Z and arylene substituted by —X—Z.

Ar in general formula (9) includes but is not limited to the substituted phenylene as the residue of phenol novolac resin and the substituted tolylene as the residue of cresol novolac resin.

Referring to the heterocycle-containing compounds having the structures of general formulas (2) to (9), the viscosity of the epoxy curing agent of the invention, the compatibility of the curing agent with the polyepoxy compound, and the hardness, flexibility, weather resistance, chemical resistance, and other physical properties of the cured epoxy resin can be liberally controlled by varying the ratio of the —X—Z-containing groups to the other groups, the species of said other groups, species of the group X, and the values of a through h.

Referring to the heterocycle-containing compound having the structure represented by any of general formulas (2) to (9), its number average molecular weight is preferably 400 to 20000 and more preferably 600 to 2000.

Referring, further, to the heterocycle-containing compound having the structure represented by any of general formulas (2) to (9), its viscosity (25° C.) as measured by rotating-cylinder viscometer is preferably in a range of 200 to 200000 cP and more preferably 400 to 50000 cP.

Referring, further, to the heterocycle-containing compound having the structure represented by any of general formulas (2) to (9), its molecular weight per equivalent of the heterocyclic group of general formula (1) is preferably 150 to 2000 and more preferably 150 to 500.

Referring to the compound having the structure represented by general formula (2), among the heterocycle-containing compounds having the structures represented by general formulas (2) to (9), compounds of the following general formulas (10) to (12) can be typically mentioned.

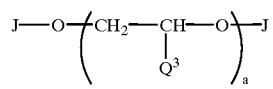

(10)

-continued

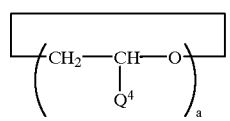
(11)

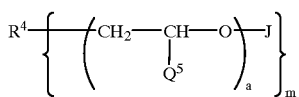
(12)

These compounds are now described in detail.

The compound of general formula (10) has a polyether backbone chain.

In formula (10), a has the same meaning as defined hereinbefore. $Q^3$ represents hydrogen, alkyl, aryl, aralkyl, haloalkyl, haloaryl, or —X—Z. The group J represents any of the groups represented by the following general formulas (13) and (14).

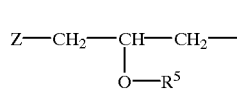
(13)

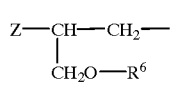
(14)

In formula (13), $R_5$ represents hydrogen; alkyl such as methyl, ethyl, butyl, etc.; acyl such as formyl, acetyl, propionyl, butyryl, isobutyryl, valeryl, isovaleryl, pivaloyl, hexanoyl, octanoyl, lauroyl, benzoyl, toluoyl, cinnamoyl, etc.; or a group of the following general formula (15).

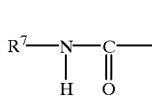
(15)

In the above formula, $R^7$ represents alkyl, aryl, or aralkyl. Specifically, the alkyl includes but is not limited to methyl, ethyl, propyl, isopropyl, butyl, isobutyl, sec-butyl, tert-butyl, pentyl, hexyl, heptyl, octyl, 2-ethylhexyl, nonyl, decyl, undecyl, dodecyl, myristyl, palmityl and stearyl. The aryl includes but is not limited to phenyl and tolyl. The aralkyl includes but is not limited to benzyl and phenethyl.

In formula (14), $R^5$ represents hydrogen, alkyl, acyl, or a group of the above general formula (15), and includes the species mentioned for $R_5$ above.

As mentioned above, $Q^3$ represents hydrogen, alkyl, aryl, haloalkyl, haloaryl or —X—Z. The alkyl includes but is not limited to methyl, ethyl, butyl, 2-ethylhexyl. The aryl includes but is not limited to phenyl and tolyl. The haloalkyl includes but is not limited to chloromethyl and chloroethyl. The haloaryl includes but is not limited to chloromethylphenyl, chloroethylphenyl, 2,4,6-trichlorophenyl, and 2,4,6-tribromophenyl. The group —X—Z is as defined hereinbefore.

The compound of general formula (11) has a polyether backbone chain.

In general formula (11), a has the same meaning as defined hereinbefore. Q4 represents hydrogen, alkyl, aryl, aralkyl, haloalkyl, haloaryl, or —X—Z.

$Q^4$ includes, but is not limited to the species mentioned for $Q^3$.

The compound of general formula (12) has a polyether backbone chain.

In general formula (12), a has the same meaning as defined above. m, which is equal to the valence number of $R^4$, represents an integer of 1 to 8. $R^4$ represents a monovalent through octavalent group available on elimination of hydrogen of OH group from a monohydric through octahydric alcohol or phenol, or a monovalent through octavalent group available upon elimination of hydrogen or hydrogens of amino group from a mono- through hexaamines. J has the same meaning as defined above. $Q^5$ represents hydrogen, alkyl, aryl, aralkyl, haloalkyl, haloaryl, or —X—Z. In at least two of a×m occurrences in formula (12), $Q^5$ represents —X—Z. In consideration of the hardness of the cured epoxy resin, it is preferable that $Q^5$ be —X—Z in 3 to 7 occurrences.

$Q^5$ includes but is not limited to the species mentioned for $Q^3$ hereinbefore.

The mono- through octahydric alcohol or phenol which gives $R^4$ on elimination of hydrogen of OH group includes but is not limited to methanol, ethanol, 1-propanol, 2-propanol, 1-butanol, 2-butanol, sec-butyl alcohol, tert-butyl alcohol, isobutyl alcohol, 2-ethyl-1-hexanol, 1-nonyl alcohol, 2-nonyl alcohol, 1-decanol, 2-decanol, 1-undecanol, 2-undecanol, phenol, cresol, xylenol, naphthanol, benzyl alcohol, 2-phenylethanol, ethylene glycol, propylene glycol, 1,3-propanediol, catechol, resorcinol, hydroquinone, biphenyl-4,4-diol, bisphenol A, bisphenol B, bisphenol AD, bisphenol F, glycerol, pyrogallol, 1,2,4-benzenetriol, phloroglucinol, pentaerythritol, ribose, arabinose, xylose, lyxose, ribulose, xylulose, fructose, glucose, galactose, maltose, lactose, and sucrose.

The mono- through hexaamines which gives $R^4$ on eilmination of hydrogen or hydrogens of amino group includes but is not limited to aliphatic amines such as methylamine, ethylamine, butylamine, dimethylamine, diethylamine, dibutylamine; aromatic amines such as aniline, methylaniline, toluidine, dibenzylamine, diaminodiphenylmethane, metaphenylenediamine, diaminodimethylphenylmethane, diaminodiethylphenylmethane, xylylenediamine; and (poly) alkylene polyamines such as ethyleneamine, tetramethylenediamine, hexamethylenediamine, diethylenetriamine, triethylenetetramine, tetraethlenepentamine, pentaethylenehexamine.

As described above, the epoxy curing agent of the present invention comprises a heterocycle-containing compound having heterocyclic groups of general formula (1) as side chains. This compound can be generally obtained by subjecting a compound having at least one secondary amine bound to a hydroxyalkyl group within the molecule and a compound having an aldehyde group or a ketone group within the molecule to dehydrative condensation reaction.

The above-mentioned compound having at least one secondary amine bound to a hydroxyalkyl group within the molecule includes but is not limited to a homopolymer of epichlorohydrin, a polymer obtainable by polymerizing epichlorohydrin in the presence of ethylene glycol; the compound obtainable by reacting any of an epichlorohydrin-ethylene oxide copolymer, an epichlorohydrin-propylene oxide copolymer, or a mixture thereof with a molar equivalent of an alkanolamine having a primary hydroxyl group in a solvent such as N,N-dimethylformamide at 80° C. and the compound obtainable by reacting any of such starting materials with an excess of said alkanolamine at 80° C.

The above-mentioned compound having an aldehyde group within the molecule includes but is not limited to formaldehyde, acetaldehyde, propionaldehyde, n-butylaldehyde, isobutylaldehyde, benzaldehyde, acrolein, and glyoxal.

The compound having a ketone group within the molecule includes but is not limited to acetone, methyl ethyl ketone, methyl isobutyl ketone, 3-pentanone, 2-hexanone, 3,3-dimethyl-2-butanone, cyclopentanone, cyclohexanone, acetophenone, and benzophenone.

Referring to the above heterocycle-containing compound having heterocyclic groups of general formula (1) as side chains, the heterocyclic group of formula (1) is readily hydrolyzed in the presence of moisture to produce a compound having a secondary amine bound to a hydroxyalkyl group and the corresponding aldehyde or ketone, thus acting as an epoxy curing agent. Thus, barring infiltration of moisture, the heterocycle-containing compound having heterocyclic groups (1) as side chains is stable even in a system containing an epoxy resin. Therefore, it is of great use as a curing component for one-component (type) epoxy resin compositions.

The rate of hydrolysis of the heterocycle-containing compound having heterocyclic groups of general formula (1) as side chains can be controlled by varying the kind of said compound having an aldehyde group or a ketone group.

The one-component (type) epoxy resin composition of the present invention comprises an epoxy curing agent having a backbone chain selected from the group consisting of the above-described polyether, polyvinyl, polyester, polyamide, polycarbonate, and novolac chains and at least two heterocyclic groups of general formula (1) as side chains and a polyepoxy compound. The amount of said epoxy curing agent with respect to said polyepoxy compound is preferably such that the equivalent ratio of the heterocyclic groups of general formula (1) of said heterocycle-containing compound to the epoxy groups of said polyepoxy compound is 0.5 to 1.5. By formulating the two components in the above proportional range, the number of active hydrogen atoms in the secondary amine formed by hydrolysis of the heterocyclic group of general formula (1) per epoxy group of said polyepoxy compound can be controlled within a range of generally 0.7 to 1.3 and preferably 0.9 to 1.1. If the ratio is less than 0.7 or more than 1.3, there will be encountered a deterioration of curing power and decreases in the water resistance and mechanical properties of the cured epoxy resin.

The above-mentioned polyepoxy compound that can be used in the one-component (type) epoxy resin composition of the present invention includes but is not limited to those polyepoxy compounds which can be obtained by the addition reaction of epichlorohydrin to polyphenols such as bisphenol A, halogenated bisphenol A, bisphenol B, bisphenol AD, bisphenol F, resorcinol, hydroquinone, pyrocatechol, 4,4'-dihydroxybiphenyl, 1,5-hydroxynaphthalene, etc.; the hydrogenation products thereof; novolac-type, glycidyl ester-type, glycidyl amine-type and heterocyclic polyepoxy compounds; polyoxyethylene or polyoxypropylene glycidyl ethers; urethane-modified polyepoxy compounds containing urethane bonds in the structure; polyepoxy compounds comprising dispersions of acrylonitrile-butadiene rubber (NBR), carboxy-terminated butadiene-nitrile rubber (CTBN), silicone rubber or the like in matrix resin, linear aliphatic epoxide compounds such as propylene oxide and butene oxide-type compounds, and alicyclic epoxide compounds such as 3,4-epoxy-6-methylcyclohexylmethylcarboxylate and other compounds. Aside from the above-mentioned compounds, any epoxy resin containing glycidyl groups reactive to active hydrogen in amine can likewise be employed. Among them, glycidyl ester, glycidyl ether, glycidyl amine, linear aliphatic epoxide, and alicyclic epoxide type compounds are preferred for the purposes of the present invention. These polyepoxy compounds can be used in combination.

For enhanced storage stability or storage stability of the one-component (type) epoxy resin composition of the present invention, it is preferable that not only the above-mentioned epoxy curing agent but also said polyepoxy compound either has no active hydrogen or has active hydrogen with an active hydrogen equivalent of not less than 4000.

The active hydrogen equivalent in the one-component (type) epoxy resin composition of the present invention is generally not less than 2000, preferably not less than 20000, and for still better results, not less than 40000. If the active hydrogen equivalent is less than 2000, the one-component (type) epoxy resin composition will have a poor storage stability.

When active hydrogen is present, the group containing active hydrogen can be inactivated to a group inert to epoxy resin to establish the nil active hydrogen state or bring the active hydrogen equivalent into a necessary range. Inactivation of the active hydrogen group can be effected by reacting a monoisocyanate compound (e.g. ethyl isocyanate, n-butyl isocyanate, phenyl isocyanate), an acid anhydride (e.g. acetic anhydride, succinic anhydride), an acid halide (e.g. benzoyl chloride), or an alkyl halide (e.g. methyl chloride, methyl bromide, ethyl chloride).

The one-component (type) epoxy resin composition of the present invention may be supplemented with additives such as a dehydrating agent, filler, plasticizer, color protectant, leveling agent, antioxidant, pigment, dispersant, reactive diluent, solvent, and so on.

The dehydrating agent mentioned above is intended to prevent the moisture infiltrating into the one-component (type) epoxy resin composition for whatever reason from reacting with the heterocyclic groups of general formula (1) which are present in the composition, and is added for improving the storage stability of the composition. The dehydrating agent that can be used includes but is not limited to silane coupling agents; metallic alkoxide; organic alkoxides such as methyl orthoformate, and dimethoxypropane; monoisocyanates; carbodiimides; silica; powdered and porous metallic oxides or carbides such as activated alumina, zeolite, and active carbon; calcium compounds comprising $CaSO_4$, $CaSO_4 \cdot \frac{1}{2} H_2O$ and CaO (e.g. quick lime and calcined gypsum); and inorganic salts which have dehydrating ability such as $K_2CO_3$ and $MgSO_4$.

The filler mentioned above is a finely divided solid substance which is added for improvements in physical properties, e.g. strength, elastic modules, weather resistance and other durability parameters, electrical and thermal conductivity characteristics, fluidity, shrinkage and other moldability parameters, etc., as well as improvements in economics such as volume building, conservation of resources, and so on. The filler that can be used includes calcium carbonate, carbon black, clay, talc, titanium dioxide, quick lime, kaolin, zeolite, diatomaceous earth, vinyl chloride paste resin, vinylidene chloride resin balloons, and so on. These fillers can be used singly or in combination.

For accelerated cure, the one-component (type) epoxy resin composition of the present invention may be supplemented with catalysts where necessary. The catalyst for catalyzing the hydrolysis reaction of said heterocyclic groups of general formula (1) includes formic acid, acetic acid, propionic acid, and dibutyltin dilaurate, among others. The catalyst that can be used for catalyzing the reaction between the epoxy group and the secondary amine produced by hydrolysis of the heterocyclic group of general formula (1) includes tertiary amines and triphenylphosphine, among other catalysts. Tertiary amines are preferred to the others, and aliphatic tertiary amines such as N,N-dimethylpropylamine, N,N,N',N'-tetramethylhexamethylenediamine, etc., alicyclic tertiary amines such as N-methylpyrrolidine, N,N'-dimethylpiperazine, etc., and aromatic tertiary amines such as benzyldimethylamine, dimethylaminomethylphenol, etc. can be mentioned. For accelerated cure, the one-component (type) epoxy resin composition of the present invention may be heated where necessary.

Uses for the one-component (type) epoxy resin composition of the present invention are virtually unlimited. By way of illustration, adhesives, sealants, anticorrosive paints, primers, concrete waterstop agents, floor coatings, concrete patching agents, printed circuit board laminates, semiconductor sealants, insulators, etc. can be mentioned.

When the one-component (type) epoxy resin composition of the present invention is employed for above-mentioned use, cure rate can be accelerated by adding a proper amount of water before application of the composition. The water is preferably added to such an amount that the equivalent ratio of the heterocyclic group in said composition to water molecule reaches within the range of 0.5 to 2.0.

Containing the epoxy curing agent of the invention, which has been described above in detail, the one-component (type) epoxy resin composition of the invention can be moisture-cured at room temperature and features very satisfactory storage stability, fast-cure, and workability characteristics. The one-component (type) epoxy resin composition of the present invention is of value as a one-can type paint or coating, an adhesive or a sealant for a variety of substrates including concrete, wood, metal and glass.

EXAMPLES

The following examples describe the present invention in further detail and should by no means be construed to be defining the scope of the invention. In the examples, all parts are by weight.

Example 1

A reaction vessel was charged with 83.4 g of ethylene glycol and 3.88 g of boron trifluoride-diethyl ether complex, and with the reaction temperature being controlled at 15 to 25° C., 500 g of epichlorohydrin was added dropwise at a constant rate over 10 to 14 hours. The reaction mixture was allowed to stand at the same temperature for 2 hours. The reaction vessel was further charged with 100 g of calcium oxide and the neutralization reaction was carried out at 80° C. for 2 hours. The salt formed by neutralization and the excess calcium oxide were filtered off to give an intermediate A. The intermediate A had a structure such that epichlorohydrin had been polymerized to either terminus of ethylene glycol and occurred as a light yellow clear viscous liquid with a number average molecular weight of 413 and a viscosity of 1530 cP (25° C.). A reaction vessel was charged with 580 g of intermediate A, 450 g of N,N-dimethylformamide, and 360 g of 2-hydroxyethylamine and the reaction was carried out at 80° C. for 2 hours. After the N,N-dimethylformamide and the excess 2-hydroxyethylamine was distilled off under reduced pressure, 640 g of potassium carbonate and 800 g of acetone were added to the reaction vessel and the reaction was further conducted at 60° C. for 48 hours. Then, 205 g of acetic anhydride was added and reacted at 25° C. for 5 hours. After completion of this reaction, the salts were filtered off and the excess acetone was distilled off under reduced pressure to provide a heterocycle-containing compound A. This heterocycle-containing compound A (hereinafter referred to as compound A) was a brown-colored viscous liquid with a heterocycle equivalent of 170, an active hydrogen equivalent of 45000, a number average molecular weight of 690, and a viscosity of 5200 cP (25° C.).

Example 2

A reaction vessel was charged with 500 g of epichlorohydrin and 500 g of toluene, and with the reaction temperature being controlled at 15 to 25° C., 7.59 g of boron trifluoride-diethyl ether complex was added dropwise to the reaction vessel to conduct an oligomerization reaction at 15 to 25° C. for 3 hours. The reaction was stopped with 10% aqueous solution of sodium hydroxide and the reaction mixture was washed with water until it became neutral. The toluene and unreacted epichlorohydrin were then distilled off under reduced pressure. The product was serially fractionated with a GPC analyzer (HLC-802 manufactured by Toyo Soda, solvent) using chloroform as the solvent to provide a fraction A, i.e. the fraction corresponding to the longest elution peak time, and a fraction B which was a mixture of other fractions. Fraction A was a viscous, colorless and clear liquid composed predominantly of a cyclic tetramer of epichlorohydrin and having a number average molecular weight of 366 and a viscosity of 13000 cP (25° C.). Fraction B was a viscous, colorless and clear liquid suspected to be composed of linear oligomers of epichlorohydrin and having a number average molecular weight of 602 and a viscosity of 4800 cP (25° C.). A reaction vessel was charged with 463 g of fraction B, 480 g of N,N-dimethylformamide, and 306 g of 2-hydroxyethylamine and the reaction was carried out at 80° C. for 2 hours. After the N,N-dimethylformamide and the excess 2-hydroxyethylamine was distilled off under reduced pressure, 690 g of potassium carbonate and 900 g of acetone were added and the reaction was conducted at 60° C. for 48 hours. Then, 220 g of acetic anhydride was added and the reaction was further carried out at 25° C. for 5 hours. After completion of the reaction, the salts were filtered off and the excess acetone was distilled off under reduced pressure to provide a heterocycle-containing compound B. This heterocycle-containing compound B (hereinafter referred to as compound B) was a brown-colored viscous liquid with a heterocycle equivalent of 157, an active hydrogen equivalent of 48000, a number average molecular weight of 1020, and a viscosity of 4600 cP (25° C.).

Example 3

A reaction vessel was charged with 458 g of fraction A described in Example 2, 480 g of N,N-dimethylformamide, and 400 g of 2-hydroxyethylamine and the reaction was carried out at 80° C. for 2 hours. After the N,N-dimethylformamide and the excess 2-hydroxyethylamine was distilled off under reduced pressure, the reaction vessel was further charged with 690 g of potassium carbonate and 900 g of acetone and the reaction was conducted at 60° C. for 48 hours. Then, 200 g of acetic anhydride was added and reacted at 25° C. for 5 hours. After completion of the reaction, the salts were filtered off and the excess acetone was distilled off under reduced pressure to provide a heterocycle-containing compound C. This heterocycle-containing compound C (hereinafter referred to as compound C) was a brown-colored viscous liquid with a heterocycle equivalent of 158, an active hydrogen equivalent of 51000, a number average molecular weight of 630, and a viscosity of 8900 cP (25° C.).

Example 4

A reaction vessel was charged with 580 g of intermediate A described in Example 1, 450 g of N,N-dimethylformamide, and 550 g of 4-hydroxybutylamine which had been prepared by aminating one terminus of 1,4-dichlorobutane with aqueous ammonia, neutralizing it with an aqueous solution of sodium hydroxide, and hydrolyzing the same under alkaline conditions, and the reaction was carried out at 80° C. for 2 hours. After the N,N-dimethylformamide and the excess 4-hydroxybutylamine was distilled off under reduced pressure, 640 g of potassium carbonate and 800 g of acetone were added to the reaction vessel and the reaction was further carried out at 60° C. for 48 hours. Then, 220 g of acetic anhydride was added and reacted at 25° C. for 5 hours. After completion of the reaction, the salts were filtered off and the excess acetone was distilled off under reduced pressure to provide a heterocycle-containing compound D. This heterocycle-containing compound D (hereinafter referred to as compound D) was a brown-colored viscous liquid with a heterocycle equivalent of 186, an active hydrogen equivalent of 49000, a number average molecular weight of 633, and a viscosity of 5000 cP (25° C.).

Example 5

A reaction vessel was charged with 200 g of polyethylene glycol (PEG 200, average molecular weight 200, Sanyo Chemical Industries, Ltd.), 500 g of epichlorohydrin, and 500 g of methylene dichloride, and with the temperature being controlled at 15 to 25° C. , 7.59 g of boron trifluoride-diethyl ether complex was added dropwise to the reaction vessel. The reaction was conducted at 15 to 25° C. for 5 hours, after which the methylene dichloride was distilled off under reduced pressure. Then, 1100 g of 20% aqueous solution of potassium hydroxide was added and the hydrolysis reaction was carried out at 100° C. for 5 hours. After completion of the reaction, the precipitate was filtered off to provide an intermediate B. This intermediate B had a structure such that an average of 2.2 mols of epichlorohydrin had been added to either terminus of polyethylene glycol with a hydroxyl group substituted for each chlorine atom and occurred as a light yellow-colored clear viscous liquid with a number average molecular weight of 660 and a viscosity of 3400 cP (25° C.). Then, 525 g of diethanolamine, 400 g of acetone, and 320 g of potassium carbonate were added to the reaction vessel and the reaction was further conducted at 60° C. for 48 hours. After completion of the reaction, potassium carbonate was filtered off and the excess acetone was distilled off under reduced pressure to provide an intermediate C. Then, 330 g of said intermediate B, 300 g of said intermediate C, 225 g of dimethyl carbonate, and 5 g of sodium methoxide were reacted at 140° C. for 10 hours and the byproduct methanol and unreacted reagents were distilled off under reduced pressure to provide a heterocycle-containing compound E. This heterocycle-containing compound E (hereinafter referred to as compound E) had a brown-colored viscous liquid with a heterocycle equivalent of 171, an active hydrogen equivalent of 51000, a number average molecular weight of 860, and a viscosity of 7600 cP (25° C.).

Example 6

A reaction vessel was charged with 615 g of styrene octamer, 320 g of methyl monochloromethyl ether, 500 g of toluene, and 5 g of aluminum chloride and the reaction was conducted at 100° C. for 5 hours. After completion of the reaction, the precipitate was filtered off and the toluene was distilled off. Then, 500 g of 2-hydroxyethylamine was added to the reaction vessel and reacted at 80° C. for 2 hours. After the excess 2-hydroxyethylamine was distilled off under reduced pressure, 800 g of potassium carbonate and 900 g of acetone were added and the reaction was further conducted at 60° C. for 48 hours. Then, 200 g of acetic anhydride was added and reacted at 25° C. for 5 hours. After completion of the reaction, the salts were filtered off and the excess acetone and acetic anhydride were distilled off under reduced pressure to provide a heterocycle-containing compound F. This heterocycle-containing compound F (hereinafter referred to as compound F) has a brown-colored viscous liquid having a heterocycle equivalent of 290, an active hydrogen equivalent of 48000, a number average molecular weight of 17000, and a viscosity of 3200 cP (25° C.).

Example 7

A reaction vessel was charged with 180 g of glycerin, 600 g of 5% aqueous solution of formaldehyde, and 500 g of 40% sulfuric acid and the acetalization reaction was carried out under dehydrative conditions at 70° C. for 5 hours. The reaction mixture was neutralized with alkali, and after water was distilled off, the salt was filtered off. To the filtrate were added 200 g of carbon tetrachloride and 5 g of triphenylphosphine and the mixture was refluxed for 5 hours. Then, 100 g of 5% sulfuric acid was added and the hydrolysis reaction was carried out at 80° C. for 2 hours. After the reaction mixture was neutralized with alkali, water was distilled off and the salt was filtered off. To the filtrate were added 300 g of terephthalic acid and 0.1 g of p-toluenesulfonic acid and the esterification reaction was conducted under dehydrative conditions. To the polyester was added 200 g of 2-aminoethanol and the reaction was carried out at 100° C. for 5 hours, after which the excess 2-aminoethanol was distilled off. To the residue were added 300 g of potassium carbonate and 200 g of acetone and the reaction was carried out at 60° C. for 48 hours. After completion of the reaction, the reaction mixture was filtered to remove the salts and the excess acetone was distilled off under reduced pressure to provide a heterocycle-containing compound G. This heterocycle-containing compound G (hereinafter referred to as compound G) was a brown-colored viscous liquid with a heterocycle equivalent of 380, an active hydrogen equivalent of 120000, a number average molecular weight of 1700, and a viscosity of 4000 cP (25° C.).

Example 8

A reaction vessel was charged with 100 g of 4-penten-5-olide, 500 g of carbon tetrachloride, and 200 g of bromine and the reaction was carried out at room temperature for 10 hours. Then, carbon tetrachloride and unreacted bromine were distilled off under reduced pressure. The residue was transferred to another reaction vessel and, after nitrogen purging, 2 g of 10% diethylammonium chloride/benzene was added. The polymerization reaction was carried out at 50° C. for 20 hours. The reaction mixture was diluted with 200 g of chloroform and poured in diethyl ether, whereupon a fibrous polymer separated out. The polymer was harvested by filtration and dried in vacuo. To the reaction vessel was added 200 g of 2-aminoethanol and the reaction was carried out at 100° C. for 5 hours, at the end of which time the excess 2-aminoethanol was distilled off. To the residue were added 300 g of potassium carbonate and 200 g of acetone and the reaction was conducted at 60° C. for 48 hours. After completion of the reaction, the reaction mixture was filtered to remove salts and the excess acetone was then distilled off under reduced pressure to provide a heterocycle-containing compound H. This heterocycle-containing compound H (hereinafter referred to as compound H) was a brown-colored viscous liquid with a heterocycle equivalent of 270, an active hydrogen equivalent of 150000, a number average molecular weight of 1100, and a viscosity of 1200 cP (25° C.).

Example 9

A reaction vessel was charged with 160 g of terephthalic acid, 81 g of methyl monochloromethyl ether, 200 g of toluene, and 2 g of aluminum chloride and the reaction was carried out at 100° C. for 5 hours. The precipitate was then filtered off and the toluene was distilled off. To the residue was added 200 g of 2-aminoethanol and the reaction was carried out at 100° C. for 5 hours. The excess 2-aminoethanol was then distilled off. To the residue was added 68 g of ethylenediamine and the polyamidation reaction was carried out under dehydrative conditions. To this reaction mixture were added 300 g of potassium carbonate and 200 g of acetone and the reaction was carried out at 60° C. for 48 hours. After completion of the reaction, the reaction mixture was filtered to remove salts and the excess acetone was distilled off under reduced pressure to provide a heterocycle-containing compound I. This heterocycle-containing compound I (hereinafter referred to as compound I) was a brown-colored viscous liquid with a heterocycle equivalent of 210, an active hydrogen equivalent of 80000, a number average molecular weight of 1700, and a viscosity of 3700 cP (25° C.).

Example 10

A reaction vessel was charged with 97 g of 4-pentene-5-lactam, 500 g of carbon tetrachloride, and 200 g of bromine and the reaction was carried out at room temperature for 10 hours. The unreacted bromine was then distilled off under reduced pressure. To the residue was added 10 g of ε-aminocaproic acid and with nitrogen gas being introduced, the temperature of the mixture was increased to 250° C. and maintained at that temperature for 5 hours. To this reaction mixture were added 200 g of 2-aminoethanol and 200 g of N,N-dimethylformamide and the reaction was further conducted at 100° C. for 5 hours. The excess 2-aminoethanol and N,N-dimethylformamide were then distilled off. To the residue were added 300 g of potassium carbonate and 200 g of acetone and the reaction was carried out at 60° C. for 48 hours. After completion of the reaction, the reaction mixture was filtered to remove salts and the excess acetone was then distilled off under reduced pressure to provide a heterocycle-containing compound J. This heterocycle-containing compound J (hereinafter referred to as compound J) was a brown-colored viscous liquid with a heterocycle equivalent of 220, an active hydrogen equivalent of 93000, a number average molecular weight of 980, and a viscosity of 4200 cP (25° C.).

Example 11

A reaction vessel was charged with 180 g of glycerin, 600 g of 5% aqueous solution of formaldehyde, and 500 g of 40% sulfuric acid and the acetalization reaction was carried out under dehydrative conditions at 70° C. for 5 hours. The reaction mixture was then neutralized with alkali and, after distillation of water, the salt was filtered off. To the filtrate were added 200 g of carbon tetrachloride and 5 g of triphenylphosphine and the mixture was refluxed for 5 hours. To this reaction mixture was added 100 g of 5% sulfuric acid and the hydrolysis reaction was carried out at 80° C. for 2 hours. The reaction mixture was then neutralized with alkali and, after distillation of water, the salt was filtered off. To the filtrate was added 180 g of dimethyl carbonate and the reaction was carried out at 140° C. for 5 hours. After the excess dimethyl carbonate and methanol were distilled off under reduced pressure, 200 g of 2-aminoethanol was added and the reaction was carried out at 100° C. for 5 hours. The excess 2-aminoethanol was then distilled off. To the residue were added 300 g of potassium carbonate and 200 g of acetone and the reaction was further carried out at 60° C. for 48 hours. After completion of the reaction, the salts were filtered off and the excess acetone was distilled off under reduced pressure to provide a heterocycle-containing compound K. This heterocycle-containing compound K (hereinafter referred to as compound K) was a brown-colored viscous liquid with a heterocycle equivalent of 210, an active hydrogen equivalent of 120000, a number average molecular weight of 1600, and a viscosity of 1400 cP (25° C.).

Example 12

A reaction vessel was charged with 200 g of phenol novolac resin (Shownol BRG-555 (trade name), Showa Polymer Co., Ltd.), 270 g of epichlorohydrin, and 200 g of toluene and, after nitrogen purging, 144 g of sodium hydroxide was added gradually so that the liquid temperature would not excessed 40° C. in a nitrogen stream. After 2 hours of ripening at 40° C., the reaction mixture was diluted with 200 g of water and allowed to separate into layers. The toluene layer was taken out and transferred to another reaction vessel. Then, 200 g of 2-aminoethanol was added and reacted at 100° C. for 5 hours. The excess 2-aminoethanol was then distilled off. To the residue were added 300 g of potassium carbonate and 200 g of acetone and the reaction was further conducted at 60° C. for 48 hours. Then, 200 g of acetic anhydride was added and reacted at 25° C. for 5 hours. After completion of the reaction, the salts were filtered off and the excess acetone was distilled off under reduced pressure to provide a heterocycle-containing compound L. This heterocycle-containing compound L (hereinafter referred to as compound L) was a brown-colored solid with a heterocycle equivalent of 290, an active hydrogen equivalent of 100000, a number average molecular weight of 1700, and a viscosity of 400 cP (150° C.).

Reference Example 1

A reactor equipped with a reflux condenser having a water trap was charged with 60 g of ethylenediamine and 400 g of methyl isobutyl ketone and, after nitrogen purging, the reaction was conducted at 120 to 130° C. for 12 hours. In order that the reaction would be smoothly carried out, the water byproduced with the progress of reaction was constantly eliminated from the reaction system. After completion of the reaction, the excess methyl isobutyl ketone was distilled off under reduced pressure to provide Ketimine A.

Example 13 to 24 and Comparative Example 1

Using the compounds A through L produced in Examples 1 to 12 and the Ketimine A synthesized in Reference Example 1 as epoxy curing agents, one-component (type) epoxy resin compositions were prepared according to the formulas of Tables 1 to 3 and evaluated for the following parameters. As the polyepoxy compound, Epikote 828 (trade name; Yuka-Shell Epoxy Co.) was used. The results are shown in Tables 1 to 3. For the convenience of reference, Comparative Example 1 was included in each table. PGE in Table 3 stands for phenyl glycidyl ether.

Evaluation

1. Storage Stability

Each of the compositions prepared according to the formulas of Tables 1 to 3 was placed in a stoppered nitrogen-purged container and stored in the atmosphere at 40° C. for 6 months and the condition of the composition was visually evaluated.

2. Mechanical Properties

Each of the compositions shown in tables 1 to 3 were exposed to the aging conditions of 25° C. and 65% RH for 4 weeks and the tensile strength and elongation of the cured resin were evaluated.

3. Adhesion Properties

Each of the compositions shown in Tables 1 to 3 was applied between a concrete slab and the steel attachment of a Kenken type adhesion tester and after 4 weeks of curing at 25° C. and 65% RH, the bond strength was measured with the Kenken type tester of the single shaft type. The condition of the interface layer was observed.

4. Film Strength

Each of the compositions shown in Tables 1 to 3 was applied in a thickness of 50 $\mu$m on a steel sheet and after 4 weeks of aging at 25° C. and 65% RH, the JIS A 5400 flex resistance test and pencil hardness test were performed.

5. Cure Rate

Each of the compositions shown in Tables 1 to 3 was applied in a thickness of 50 $\mu$m on a steel sheet and aged at 25° C. and 65% RH. The pencil hardness (JIS A 5400) was measured serially after 1, 2, 3, and 7 days.

TABLE 1

|  | Example 13 | Example 14 | Example 15 | Example 16 | Comparative Example 1 |
|---|---|---|---|---|---|
| Composition (parts) |  |  |  |  |  |
| Epikote 828 | 100 | 100 | 100 | 100 | 100 |
| Compound A | 90 |  |  |  |  |
| Compound B |  | 120 |  |  |  |
| Compound C |  |  | 120 |  |  |
| Compound D |  |  |  | 100 |  |
| Ketimine A |  |  |  |  | 36 |
| Evaluation |  |  |  |  |  |
| Storage stability | No change | No change | No change | No change | Precipitation occurred |
| Tensile strength (kgf/cm$^2$) | 280 | 270 | 330 | 360 | 320 |
| Elongation (%) | 57 | 59 | 32 | 50 | 14 |
| Adhesive properties | Concrete destroyed | Concrete destroyed | Concrete destroyed | Concrete destroyed | Concrete destroyed |
| Flex resistance | Flexure withstood | Flexure withstood | Flexure withstood | Flexure withstood | Cracks and peels observed |
| Pencil hardness | 3H | 3H | 4H | 3H | 3H |
| Cure rate |  |  |  |  |  |
| Day 1 | 2H | 2H | 3H | 2H | 4B |
| Day 2 | 3H | 3H | 4H | 3H | B |
| Day 3 | 3H | 3H | 4H | 3H | H |
| Day 7 | 3H | 3H | 4H | 3H | 3H |

TABLE 2

|  | Example 17 | Example 18 | Example 19 | Example 20 | Comparative Example 1 |
|---|---|---|---|---|---|
| Composition (parts) |  |  |  |  |  |
| Epikote 828 | 100 | 100 | 100 | 100 | 100 |

TABLE 2-continued

|  | Example 17 | Example 18 | Example 19 | Example 20 | Comparative Example 1 |
|---|---|---|---|---|---|
| Compound E | 92 | | | | |
| Compound F | | 160 | | | |
| Compound G | | | 200 | | |
| Compound H | | | | 145 | |
| Ketimine A | | | | | 36 |
| Evaluation | | | | | |
| Storage stability | No change | No change | No change | No change | Precipitation occurred |
| Tensile strength (kgf/cm²) | 280 | 340 | 290 | 320 | 320 |
| Elongation (%) | 57 | 25 | 41 | 48 | 14 |
| Adhesive properties | Concrete destroyed | Concrete destroyed | Concrete destroyed | Concrete destroyed | Concrete destroyed |
| Flex resistance | Flexure withstood | Flexure withstood | Flexure withstood | Flexure withstood | Cracks and peels observed |
| Pencil hardness | 3H | 4H | 3H | 3H | 3H |
| Cure rate | | | | | |
| Day 1 | 4B | 3H | 3H | 3H | 4B |
| Day 2 | H | 4H | 3H | 3H | B |
| Day 3 | 2H | 4H | 3H | 3H | H |
| Day 7 | 3H | 4H | 3H | 3H | 3H |

TABLE 3

|  | Example 21 | Example 22 | Example 23 | Example 24 | Comparative Example 1 |
|---|---|---|---|---|---|
| Composition (parts) | | | | | |
| Epikote 828 | 100 | 100 | 100 | 100 | 100 |
| Compound I | 115 | | | | |
| Compound J | | 119 | | | |
| Compound K | | | 113 | | |
| Compound L | | | | 90 | |
| Ketimine A | | | | | 36 |
| PGE | | | | 10 | |
| Evaluation | | | | | |
| Storage stability | No change | No change | No change | No change | Precipitation occurred |
| Tensile strength (kgf/cm²) | 380 | 350 | 340 | 260 | 320 |
| Elongation (%) | 38 | 31 | 42 | 33 | 14 |
| Adhesive properties | Concrete destroyed | Concrete destroyed | Concrete destroyed | Concrete destroyed | Concrete destroyed |
| Flex resistance | Flexure withstood | Flexure withstood | Flexure withstood | Flexure withstood | Cracks and peels observed |
| Pencil hardness | 3H | 4H | 3H | 3H | 3H |
| Cure Rate | | | | | |
| Day 1 | 3H | 4H | 3H | 3H | 4B |
| Day 2 | 3H | 4H | 3H | 3H | B |
| Day 3 | 3H | 4H | 3H | 3H | H |
| Day 7 | 3H | 4H | 3H | 3H | 3H |

The one-component (type) epoxy resin compositions of Examples 13 to 24 invariably exhibited satisfactory storage stability characteristics and showed faster cure rates as compared with the one-component (type) epoxy resin composition containing Ketinine A as the curing component.

We claim:

1. A one-component epoxy resin composition comprising a polyepoxy compound and a heterocycle-containing compound having a structure represented by any of he following general formulae (2) through (9):

(2)

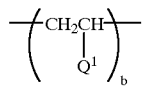

(3)

-continued

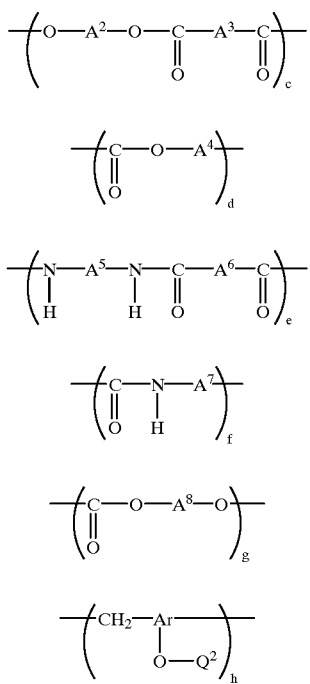

wherein in formula (2), "a" represents an integer of 3 to 200, $A^1$ represents at least one member selected from the group consisting of alkylene group which is either substituted by —X—Z or unsubstituted, arylene group, arylalkylene group, haloalkylene group and a residue available on ring-opening polymerization of a glycidyl ether; wherein in formula —X—Z, X represents a divalent hydrocarbon group which may optionally have one or more linkages selected from the group consisting of ether, imino, amide, urethane, urea and sulfide linkages and Z represents a heterocyclic group of the formula (1):

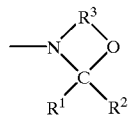

wherein $R_1$ and $R^2$ may be the same or different and each represents hydrogen atom, straight-chain or branched $C_1$ to $C_6$ alkyl or alkenyl, or $C_6$ to $C_0$ aryl; or $R^1$ and $R^2$, taken together with the adjacent carbon atom, represents $C_5$ to $C_7$ cycloalkyl; $R^3$ represents $C_1$ to $C_{10}$, alkylene;

wherein at least three of $A^1$ in formula (2) represent alkylene group substituted by —X—Z;

wherein in formula (3), "b" represents an integer of 3 to 200, and $Q^1$ represents at least one member selected from the group consisting of hydrogen atom, alkyl group, aryl group, haloalkyl group, haloaryl group, alkoxycarbonyl group, acetoxy group and —X—Z;

wherein at least three of $Q^1$ in formula (3) represent —X—Z;

wherein in formula (4), "c" represents an integer of 2 to 200, and $A^2$ and $A^3$ may be the same or different and each represents at least one member selected from the group consisting of alkylene group which is either substituted by —X—Z or unsubstituted, arylene group which is either substituted by —X—Z or unsubstituted, aralkylene group and haloalkylene group;

wherein at least three of $A^2$ and $A^3$ in formula (4) represent at least one species selected from the group consisting of alkylene group substituted by —X—Z and arylene group substituted by —X—Z;

wherein in formula (5), "d" represents an integer of 3 to 200, and $A^4$ represents at least one selected from the group consisting of alkylene group which is either substituted by —X—Z or unsubstituted, arylene group which is either substituted by —X—Z or unsubstituted, aralkylene group and haloalkylene group;

wherein at least three of $A^4$ in formula (5) represent at least one species selected from the group consisting of alkylene group substituted by —X—Z and arylene group substituted by —X—Z;

wherein in formula (6), "e" represents an integer of 2 to 200, and $A^5$ and $A^6$ may be the same or different and each represents at least one selected from the group consisting of alkylene group which is either substituted by —X—Z or unsubstituted, arylene group which is either substituted by —X—Z or unsubstituted, aralkylene group and haloalkylene group;

wherein at least three of $A^5$ and $A^6$ in formula (6) represent at least one species selected from the group consisting of alkylene group substituted by —X—Z and arylene group substituted by —X—Z;

wherein in formula (7), "f" represents an integer of 3 to 200, and $A^7$ represents at least one selected from the group consisting of alkylene group which is either substituted by —X—Z or unsubstituted, arylene group which is either substituted by —X—Z or unsubstituted, aralkylene group and haloalkylene group;

wherein at least three of $A^1$ in formula (7) represent at least one species selected from the group consisting of alkylene group substituted by —X—Z and arylene group substituted by —X—Z;

wherein in formula (8), "g" represents an integer of 3 to 200, and $A^8$ represents at least one selected from the group consisting of alkylene group which is either substituted by —X—Z or unsubstituted, arylene group which is either substituted by —X—Z or unsubstituted, aralkylene group and haloalkylene group;

wherein at least three of $A^0$ in formula (8) represent at least one species selected from the group consisting of alkylene group substituted by —X—Z and arylene group substituted by —X—Z;

wherein in formula (9), "h" represents an integer of 3 to 200, Ar represents aryl group, and $Q^2$ represents at least one species selected from the group consisting of hydrogen atom, epoxy group and —X—Z; and wherein at least three of $Q^2$ in formula (9) represent —X—Z.

2. The one-component epoxy resin composition according to claim 1 wherein the equivalent ratio of the heterocyclic groups of general formula (1) of the heterocycle-containing compound to the epoxy groups of the polyepoxy compound is 0.5 to 1.5.

3. The one-component epoxy resin composition according to claim 1 wherein the polyepoxy compound is a compound selected from the group consisting of glycidyl ether, glycidyl ester, glycidyl amine, linear aliphatic epoxide, and alicyclic epoxide compounds.

4. The one-component (type) epoxy resin composition according to claim 1 wherein the polyepoxy compound either has no active hydrogen or has active hydrogen with an active hydrogen equivalent of not less than 4000.

5. The one-component epoxy resin composition according to claim 1 wherein the active hydrogen equivalent in the one-component epoxy resin composition is not less than 2000.

6. A method for curing an polyepoxy compound comprising reacting said polyepoxy coumpound with a heterocycle-containing compound having a structure represented by any of the general formulae (2) through (9) in the presence of moisture or water:

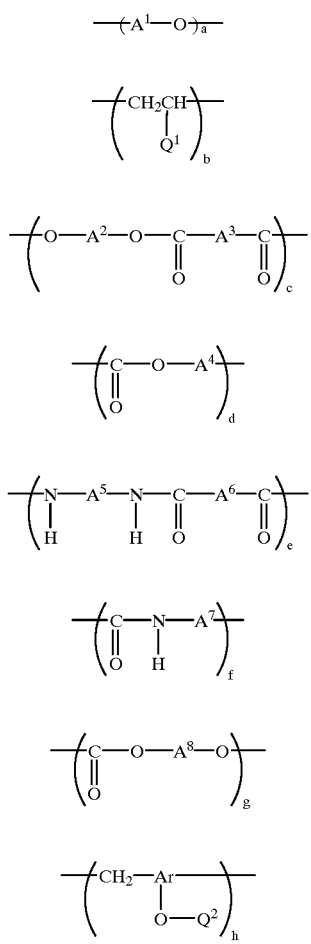

wherein in formula (2), "a" represents an integer of 3 to 200, $A^1$ represents at least one member selected from the group consisting of alkylene group which is either substituted by —X—Z or unsubstituted, arylene group, arylalkylene group, haloalkylene group and a residue available on ring-opening polymerization of a glycidyl ether; wherein in formula —X—Z, X represents a divalent hydrocarbon group which may optionally have one or more linkages selected from the group consisting of ether, imino, amide, urethane, urea and sulfide linkages and Z represents a heterocyclic group of the formula (1):

$$\begin{array}{c} R^3 \\ | \\ -\!\!\!-\!\!N\!\!-\!\!\!-\!\!O \\ | \\ C \\ R^1 \quad R^2 \end{array} \quad (1)$$

wherein $R^1$ and $R^2$ may be the same or different and each represents hydrogen atom, straight-chain or branched $C_1$ to $C_6$ alkyl or alkenyl, or $C_5$ to $C_6$ aryl; or $R^1$ and $R^2$, taken together with the adjacent carbon atom, represents $C_5$ to $C_7$ cycloalkyl; $R^3$ represents $C_2$ to $C_{10}$ alkylene;

wherein at least three of $A^1$ in formula (2) represent alkylene group substituted by —X—Z;

wherein in formula (3), "b" represents an integer of 3 to 200, and $Q^1$ represents at least one member selected from the group consisting of hydrogen atom, alkyl group, aryl group, haloalkyl group, haloaryl group, alkoxycarbonyl group, acetoxy group and —X—Z;

wherein at least three of $Q^1$ in formula (3) represent —X—Z;

wherein in formula (4), "c" represents an integer of 2 to 200, and $A^2$ and $A^3$ may be the same or different and each represents at least one member selected from the group consisting of alkylene group which is either substituted by —X—Z or unsubstituted, arylene group which is either substituted by —X—Z or unsubstituted, aralkylene group and haloalkylene group;

wherein at least three of $A^1$ and $A^2$ in formula (4) represent at least one species selected from the group consisting of alkylene group substituted by —X—Z and arylene group substituted by —X—Z;

wherein in formula (5), "d" represents an integer of 3 to 200, and $A^4$ represents at least one selected from the group consisting of alkylene group which is either substituted by —X—Z or unsubstituted, arylene group which is either substituted by —X—Z or unsubstituted, aralkylene group and haloalkylene group;

wherein at least three of $A^4$ in formula (5) represent at least one species selected from the group consisting of alkylene group substituted by —X—Z and arylene group substituted by —X—Z;

wherein in formula (6), "e" represents an integer of 2 to 200, and $A^5$ and $A^6$ may be the same or different and each represents at least one selected from the group consisting of alkylene group which is either substituted by —X—Z or unsubstituted, arylene group which is either substituted by —X—Z or unsubstituted, aralkylene group and haloalkylene group;

wherein at least three of $A^5$ and $A^6$ in formula (6) represent at least one species selected from the group consisting of alkylene group substituted by —X—Z and arylene group substituted by —X—Z;

wherein in formula (7), "f" represents an integer of 3 to 200, and $A^7$ represents at least one selected from the group consisting of alkylene group which is either substituted by —X—Z or unsubstituted, arylene group which is either substituted by —X—Z or unsubstituted, aralkylene group and haloalkylene group;

wherein at least three of $A^7$ in formula (7) represent at least one species selected from the group consisting of alkylene group substituted by —X—Z and arylene group substituted by —X—Z;

wherein in formula (8), "g" represents an integer of 3 to 200, and $A^8$ represents at least one selected from the group consisting of alkylene group which is either substituted by —X—Z or unsubstituted, arylene group which is either substituted by —X—Z or unsubstituted, aralkylene group and haloalkylene group;

wherein at least three of $A^8$ in formula (8) represent at least one species selected from the group consisting of alkylene group substituted by —X—Z and arylene group substituted by —X—Z;

wherein in formula (9), "h" represents an integer of 3 to 200, Ar represents aryl group, and $Q^2$ represents at least one species selected from the group consisting of hydrogen atom, epoxy group and —X—Z; and wherein at least three of $Q^2$ in formula (9) represent —X—Z.

* * * * *